United States Patent Office 3,153,569
Patented Oct. 20, 1964

3,153,569
MANUFACTURE OF DENSE THORIUM OXIDE
Larry K. Duncan, Chattanooga, Tenn., assignor to Vitro Corporation of America, New York, N.Y., a corporation of Delaware
No Drawing. Filed Feb. 19, 1962, Ser. No. 174,295
12 Claims. (Cl. 23—14.5)

This invention relates to the manufacture of thorium oxide ($ThO_2$) and more particularly to a process for the preparation of $ThO_2$ in dense, sintered, particulate form.

The use of thorium oxide in nuclear applications and in the production of refractory ceramic materials is well known. Present techniques for the production of dense $ThO_2$ in finely-divided sintered form involve either "hot pressing" (pressure sintering) at temperatures of at least 1700° C. or cold compacting followed by sintering at about 1500° C. in the presence of certain additives.

Not only are these very high sintering temperatures impractical, but the use of metallic additives to reduce sintering temperatures introduces impurities into the final product which restricts the utilization of the oxide for many purposes. Boron-containing additives, in particular, have been found undesirable since their high rate of neutron absorption eliminates the utilization in nuclear applications of thorium oxides prepared by using these boron additives. Consequently, a process for manufacturing dense, sintered $ThO_2$ in particulate form and in relatively high degrees of purity would represent a highly desirable advance in the art.

An object of this invention is to produce a dense, sintered $ThO_2$ in finely-divided form and in relatively high degrees of purity.

Another object is to perfect a simplified method of manufacturing dense, sintered particles of $ThO_2$ at practical sintering temperatures without requiring the presence of metallic additives.

Other objects and advantages of the invention will be apparent from the following description.

It has now been discovered that the above objects can be attained by slurrying a uniform, fine-particle-sized thorium oxide with an aqueous solution containing a wetting agent and a fluoride selected from the group consisting of $NH_4F$, $HF$, and $NH_4HF_2$ and thereafter sintering the wet filter cake at a temperature such that the resultant product is a dense, sintered, granular $ThO_2$.

It has been observed that the particle size of the $ThO_2$ which is slurried with the aqueous solution of the fluoride reagent has an effect on the structure of the final product. Thus, for best results in terms of a highly densified product exhibiting "massive sintering," the percent of fluoride reagent adsorption on the slurried $ThO_2$ particles should be as high as possible. Since the more finely-divided particles have a greater surface area and consequently adsorb more fluoride reagent, it is advantageous to utilize very finely-divided oxide particles in the slurry step.

Thorium oxide particles ranging in size from about 1 to about 5 microns are particularly suitable for use in the process of the invention. It is preferred to prepare $ThO_2$ within this particle size range by calcining a compound which decomposes to yield $ThO_2$ at the temperatures prevalent during firing. Among the thorium compounds which can be utilized are the carbonate, hydroxide, sulfate, formate, acetate, tartrate, nitrate, acetyl acetonate and especially thorium oxalate. The use of thorium oxalate as a starting material for the sintering process has several advantages. The primary technical advantage stems from the uniform, fine-particle $ThO_2$ which can be obtained from precipitated thorium oxalate. Furthermore, additional chemical purification of the thorium occurs in the oxalate preparation. Also, the preparation is simple, easily controlled and the oxalate is readily handled and can be calcined satisfactorily using conventional equipment. However, the calcination is basically applicable to any thorium compound which can be decomposed to the oxide at temperatures below about 2200° F.

The calcination of the decomposable thorium compound is preferably accomplished at the minimum temperature which allows substantially complete conversion to thorium oxide to produce the most active, high-surface-area oxide for use in the fluoride wash. However, sintered specimens having an acceptable bulk density of about 5.1 have been prepared from ceramic grade $ThO_2$ which had been produced by calcining thorium oxalate at 1850° F. The difference in the final product is essentially one of degree. Oxides calcined at higher temperatures are less likely to undergo "massive sintering" in the final firing, but they do demonstrate some grain growth and agglomeration and represent a satisfactory product from a standpoint of denseness and hardness. Generally speaking, however, the calcination temperature when the preferred thorium oxalate is being treated ranges from about 1000° to about 1300° F.

The preferred method for preparing thorium oxalate for subsequent calcination involves the precipitation of the oxalate from a solution of thorium nitrate. The particular conditions observed during the preparation of thorium oxalate by this technique will generally determine the particle size of the resultant oxalate. Thus, the rapid addition of solid oxalic acid to a dilute solution of thorium nitrate maintained at ambient temperatures will yield oxalate crystals of about 1-5 microns in size. Higher temperatures, larger concentrations of thorium nitrate and the presence of a mineral acid will generally act to increase the particle size of the oxalate. Further data on the variables in this technique will be presented in the examples. It should be recognized, however, that the decomposable thorium compound could be prepared by other methods. For example, thorium oxalate may be precipitated from a solution containing a thorium compound dissolved in an acid such as HCl.

The fine-particle $ThO_2$ prepared by calcination of thorium oxalate or obtained from some other source, is then washed with certain fluorides under conditions such that a relatively large amount of the fluoride reagent is retained on the $ThO_2$ particles by adsorption. Thus, the particulate $ThO_2$ is slurried with an aqueous solution containing a wetting agent and a fluoride compound selected from the group consisting of ammonium fluoride, ammonium acid fluoride, and hydrofluoric acid. A preferred solution is one in which the solids content based on the fluoride reagent is about 3-4% by weight and the weight ratio of fluoride ion to $ThO_2$ is about 4-5%. The oxide particles and the aqueous mixture are slurried with or without mechanical agitation for a period of time sufficient to insure maximum adsorption of the fluoride reagent upon the $ThO_2$ particles.

The purpose of the wetting agent in the mixture is to provide for thorough dispersion of the oxide particles in the slurry and the selection of any particular wetting agent is merely a matter of choice. A satisfactory agent for the purposes of this invention is "Nopcosant" which is a sodium salt of a condensed naphthalene sulfonate manufactured by the Nopco Chemical Company. Other suitable wetting agents include soaps such as sodium stearate, anionic detergents such as sulfated acids and alcohols, cationic detergents such as the alkyl pyridinium halides, nonionic detergents such as the reaction products of alkylene oxides with phenols and alcohols, and many other materials.

Upon completion of the fluoride-washing step, the slurry is filtered, preferably without washing, and the resultant wet cake is heated at temperatures high enough to produce a dense, sintered product. A preferred range of sintering temperatures is about 1800°–2150° F. A dense, highly sintered, granular $ThO_2$ is obtained which is essentially dustless and is suitable for all applications for which thorium oxide is normally utilized. If desired, the final product may be calcined at temperatures of 3100°–3200° F. to assure maximum densification of the $ThO_2$ although it is emphasized that such a step is not necessary to provide the advantages of the invention. The dense, hard, granular thorium oxide has a bulk density of about 4–6 compared to a density of about 2 for ordinary $ThO_2$. The product is well suited to crushing and grinding to controlled grain sizes ranging from ¼″ ceramic grog to fine powders.

The following examples illustrate the use of the process according to the invention. It will be understood, however, that these examples are included merely for purpose of illustration and are not intended to limit the scope of the invention as described herein, unless otherwise specifically indicated.

Example I

Thorium oxalate was precipitated from a thorium nitrate solution at ambient temperatures by the addition of a slight excess of solid oxalic acid. The filtered and washed oxalate was calcined in an electric muffle furnace for about 4 hours at 1000° F. to yield 24 lbs. of thoria. The extent of decomposition of this oxalate was shown by the 1–2% further weight loss on ignition of a sample at 2000° F. The 24 lbs. of thorium oxide was slurried in 7 gals. of water containing 2.5 lbs. of $NH_4HF_2$ and 0.25 lb. of Nopcosant wetting agent. The slurry was agitated for about 16 hours and filtered without wash. The cake retained about 75% of the initial fluoride. This wet cake was calcined at 2000° F. to give a dense mass which, when crushed to 18 mesh, had a bulk density = 5.2.

Example II

About 240 lbs. of thorium nitrate was converted to the oxalate as in the preceding example by precipitation with oxalic acid at ambient temperatures. One portion of the oxalate was calcined in a stainless steel crucible placed within a gas-fired furnace for about 19 hours at about 1000° F. Twenty pounds of thoria was obtained which showed no further weight loss on ignition at 2000° F. This oxide was slurried in 6 gals. of water containing 1.75 lbs. of $NH_4HF_2$ and 0.22 lb. of Nopcosant. The slurry was agitated for 10 hours, allowed to stand 48 hours, and filtered without wash. The filter cake was calcined for 8–10 hours in a muffle furnace at 1850°–2150° F., yielding 20 lbs. of dense, sintered thorium oxide.

A second portion of the oxalate was calcined in a steel crucible for 12 hours at 1000° F., giving 40 lbs. of thoria with 0.4% weight loss on ignition at 2000° F. This sample was agitated for 10 hours in 20 gals. of water containing 5.4 lbs. of $NH_4HF_2$ and 0.66 lb. of Nopcosant. The filtered, unwashed cake was calcined 8–10 hours at 1880°–2100° F. to give 38 lbs. of dense thoria.

A third portion of the oxalate was calcined in a steel crucible for 8 hours at 1000° F. and yielded 43 lbs. of thoria. The $ThO_2$ was slurried in an aqueous solution containing 5% $F/ThO_2$, as $NH_4HF_2$, plus Nopcosant wetting agent, filtered and calcined.

Sixty-five pounds of dense thoria from the above three preparations was finally calcined at 3100°–3200° F. for 18 hours to assure maximum density. The bulk density of the product, when crushed to 40 mesh, was 5.9.

Example III

The effect of variations in thorium oxalate crystal size on the properties of the fluoride-washed and densified oxide was determined. Large crystals were precipitated by the slow addition of solid oxalic acid to hot, concentrated solutions of thorium nitrate in strong nitric acid; smaller crystals were obtained by the rapid addition of oxalic acid to more dilute, less acidic solutions of thorium nitrate. These are generally recognized techniques for control of thorium oxalate crystal size. The oxalates were calcined at 1300° F. for 4–5 hours. The oxides were then slurried 4–6 hours in an aqueous solution of 3% $NH_4HF_2$ and 0.5% wetting agent (Nopcosant), filtered, and calcined at 1800°–1900° F. Bulk sintering tendencies, textures, and tap densities of the pulverified oxides were compared, as follows:

| Run | Oxalate Preparation Method | Percent of $NH_4HF_2$ Retained in Cake (before final firing) | Tap Dens. (g./cc.) Final Oxide Powder | Degree of "Massive Sintering" |
|---|---|---|---|---|
| 1 | Slow addition, from hot 6 N $HNO_3$ (30–60 Micron crystals). | 74 | 4.3 | None. |
| 2 | 40° C., 200 g./l. $ThO_2$, 1 N $HNO_3$. | 77 | 4.6 | Very Slight. |
| 3 | 30° C., 200 g./l. $ThO_2$, no added $HNO_3$. | 81 | 5.9 | Little. |
| 4 | Rapid addition, 20° C., 80 g./l. $ThO_2$, no added $HNO_3$ (1–2 micron crystals). | | 5.6–6.0 | Extensive. |

In runs 1–3 where oxalate crystals larger than about 3–5 microns were employed, sintering of the final thorium oxide occured primarily within the oxide "agglomerate" or skeleton corresponding to the individual oxalate crystal. These normally soft, friable agglomerates became hard, glassy, and dense by this process and gave coarse powders having bulk densities of about 4–6. However, none of these agglomerates exhibited more than a slight degree of the massive sintering and formation of solid "grog" which resulted from the treatment under the same conditions of thorium oxide having a particle size of 1–2 microns.

For densification of $ThO_2$ to a coarse, dustless powder or grain from which finer dense powders can be prepared, precipitation of thorium oxalate as medium-to-coarse crystals is advantageous. However, large dense masses suitable for crushing to grog of 8–20 mesh or so can better be obtained through use of very fine-particle oxalate.

Example IV

The applicability of other fluorides or ammonium halides to the production of dense, hard thorium oxide was determined. Equal samples of thorium oxide were slurried in 3% aqueous solutions of $NH_4HF_2$, $NH_4I$, $NH_4Br$, and $NH_4F$, and in a 2% HF solution (the equivalent of 3% $NH_4HF_2$). The normal 0.5% wetting agent was used in each sample. The oxides were filtered and calcined at 1800° F. Tap densities and sintering characteristics of the resulting oxides were as follows:

| Run | Reagent | Powder Density (g./cc.) | Sintering |
|---|---|---|---|
| 1 | $NH_4HF_2$ | 5.3 | Extensive. |
| 2 | $NH_4F$ | 3.8 | Less than Run No. 1. |
| 3 | $NH_4Br$ | 2.0 | None. |
| 4 | $NH_4I$ | 2.4 | None. |
| 5 | HF | 6.4 | Extensive. |

As a result of these tests, the $NH_4HF_2$ and HF washes were considered the most effective with the $NH_4F$ being somewhat less effective. The $NH_4I$ and $NH_4Br$ were essentially without effect. Consideration was limited to ammonium salts and acids since metal salts would contaminate the product.

Example V

Various impurities which might be present at low concentrations in a "ceramic grade" thoria are known to influence the sintering of $ThO_2$. These impurities, such as the oxides of silicon, iron, cerium, calcium, and titanium, generally lower the sintering temperatures of thoria. To demonstrate the effectiveness of the fluoride-wash process of the invention in densifying extremely pure thoria, a sample of commercial "high-purity" thorium oxide (approx. 99.8% purity) was processed in the manner described above. After calcination at 1800°–1900° F. the thoria was a dense, solidified mass. When pulverized to −30 mesh, it had a tap density of 5.6 g./cc.

*Example VI*

Samples of thorium hydrate (hydrous thorium oxide or thorium hydroxide) were precipitated from "mantle grade" thorium nitrate solutions with aqueous ammonium hydroxide. This preparation, due to its amorphous, gel-like nature, became rather dense in the initial low-temperature (1300° F.) calcination, exhibiting a bulk density of 4.1. Consequently, its degree of further sintering after the fluoride wash and refiring was slight, showing a bulk density of 4.9. There was virtually no massive sintering although some grain growth and agglomeration could be detected microscopically.

It will be seen that the process of the present invention has the following advantages over present techniques for producing dense, sintered thorium oxide. First, the novel process permits the preparation of highly sintered $ThO_2$ particles at temperatures much lower than those presently employed in the art. Secondly, the process eliminates the use of conventional metallic additives which lower the sintering temperature but act as impurities in the final product. Third, the present technique simplifies the production of highly sintered $ThO_2$ by eliminating the step of compacting with high pressure equipment.

It will occur to those skilled in the art that there are many modifications to the invention as specifically described herein. It is intended to include all such modifications within the scope of the appended claims.

I claim:

1. A method of preparing dense, granular $ThO_2$ which comprises:
   (a) calcining a finely-divided compound which decomposes to yield thorium oxide by firing;
   (b) slurrying the fired $ThO_2$ particles with an aqueous solution containing a wetting agent and a fluoride selected from the group consisting of $NH_4F$, $NH_4HF_2$ and HF; and
   (c) recovering the washed $ThO_2$ particles from the aqueous slurry and
   (d) heating the washed particles until a dense, sintered $ThO_2$ product is obtained.

2. A method as recited in claim 1 in which the initial calcining is performed at temperatures of about 1000°–1300° F. and the final sintering is at a temperature of about 1800°–2150° F.

3. A method according to claim 1 in which the finely divided thorium compound being calcined is selected from the group consisting of the oxalate, carbonate, hydroxide, sulfate, formate, acetate, tartrate, acetyl acetonate and nitrate of thorium.

4. A method according to claim 3 in which the compound being initially calcined is thorium oxalate.

5. A method according to claim 3 in which the particle size of the thorium compound is about 1–5 microns.

6. A method of densifying $ThO_2$ which comprises:
   (a) slurrying a finely-divided $ThO_2$ with an aqueous solution containing a wetting agent and a reagent selected from the group consisting of $NH_4F$, $NH_4HF_2$, and HF;
   (b) recovering the washed $ThO_2$ particles from the aqueous slurry and
   (c) heating the washed particles until a dense, sintered $ThO_2$ product is obtained.

7. A method according to claim 6 in which the finely-divided $ThO_2$ is obtained by calcining thorium oxalate at a temperature of about 1000°–1300° F.

8. A method of preparing thorium oxide in a dense, compact, particulate form which comprises:
   (a) firing a finely-divided thorium oxalate at a temperature of about 1000°–1300° F.;
   (b) slurrying the resultant fired $ThO_2$ particles with a dilute aqueous solution containing a wetting agent and ammonium acid fluoride in which the weight ratio of fluoride ion to thorium oxide is about 4–5%;
   (c) recovering the washed $ThO_2$ particles from the aqueous slurry and
   (d) heating the washed particles obtained from the aqueous slurry at a temperature of about 1800°–2150° F. until a dense, sintered $ThO_2$ product is obtained.

9. A method according to claim 8 in which the wetting agent is a sodium salt of a condensed naphthalene sulfonate.

10. A method according to claim 8 in which the finely-divided thorium oxalate is prepared by rapidly adding oxalic acid to a dilute solution of throium nitrate maintained at about 20° C.

11. A method according to claim 8 in which the filtered $ThO_2$ is thereafter heated at about 3100°–3200° F. to assure maximum densification.

12. A method of preparing dense, granular $ThO_2$ which comprises:
   (a) slurrying a finely-divided $ThO_2$ with an aqueous solution containing a water-soluble condensed naphthalene sulfonate and a reagent selected from the group consisting of $NH_4F$, $NH_4HF_2$ and HF,
   (b) filtering the aqueous slurry, and
   (c) heating the wet filter cake obtained from the slurrying step at a temperature of about 1800°–3200° F. until a dense, sintered $ThO_2$ product is obtained, the amount of said wetting agent being sufficient to thoroughly disperse the oxide particles in the slurry and the weight ratio of fluoride ion to thorium oxide being about 4–5%.

References Cited in the file of this patent

Lane et al.: Fluid Fuel Reactors, Wesley Publishing Co. 1958, pp. 139–143.